(12) United States Patent
Gao et al.

(10) Patent No.: US 11,104,835 B2
(45) Date of Patent: Aug. 31, 2021

(54) METHODS AND SYSTEMS FOR USING ELASTOCALORIC MATERIALS IN SUBTERRANEAN FORMATIONS

(71) Applicant: Halliburton Energy Services, Inc., Houston, TX (US)

(72) Inventors: Li Gao, Katy, TX (US); David L. Perkins, Easton, PA (US); Michael T. Pelletier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/338,319

(22) PCT Filed: Oct. 31, 2016

(86) PCT No.: PCT/US2016/059630
§ 371 (c)(1),
(2) Date: Mar. 29, 2019

(87) PCT Pub. No.: WO2018/080526
PCT Pub. Date: May 3, 2018

(65) Prior Publication Data
US 2020/0024498 A1     Jan. 23, 2020

(51) Int. Cl.
*E21B 36/00* (2006.01)
*C09K 8/03* (2006.01)
*E21B 43/16* (2006.01)

(52) U.S. Cl.
CPC .............. *C09K 8/03* (2013.01); *E21B 36/001* (2013.01); *E21B 43/16* (2013.01)

(58) Field of Classification Search
CPC ........................... E21B 36/001; E21B 47/011
See application file for complete search history.

(56) References Cited

U.S. PATENT DOCUMENTS 6,367,281 B1    4/2002  Hugenroth
7,444,209 B2*  10/2008  Damien ................ F16K 31/005
                                                          137/80

(Continued)

FOREIGN PATENT DOCUMENTS

WO     2013/119125 A1    8/2013

OTHER PUBLICATIONS

Tušek, J., et al. "Elastocaloric effect of Ni—Ti wire for application in a cooling device." Journal of Applied Physics 117.12 (2015): 124901.

(Continued)

*Primary Examiner* — Sean D Andrish
(74) *Attorney, Agent, or Firm* — Thomas Rooney; Baker Botts L.L.P.

(57) ABSTRACT

Methods and systems for using a cooling apparatus comprising an elastocaloric material to reduce the temperature of downhole packages in a subterranean formation are provided herein. In one or more embodiments, the methods of the present disclosure comprise: disposing a downhole package in a wellbore penetrating a portion of a subterranean formation; and disposing a cooling apparatus comprising an elastocaloric material and at least one actuator downhole in the wellbore, wherein the cooling apparatus is adjacent to the downhole package. In one or more embodiments, the systems of the present disclosure comprise: a downhole package having a temperature; and a cooling apparatus coupled to the downhole package, wherein the cooling apparatus comprises an elastocaloric material coupled to at least one actuator, wherein the cooling apparatus is configured to reduce the temperature of the downhole package.

19 Claims, 3 Drawing Sheets

(56) References Cited

U.S. PATENT DOCUMENTS

| | | | |
|---|---|---|---|
| 2003/0085039 A1* | 5/2003 | DiFoggio | ............ E21B 47/017 |
| | | | 166/302 |
| 2004/0264543 A1 | 12/2004 | Storm et al. | |
| 2010/0147523 A1* | 6/2010 | DiFoggio | ............ E21B 47/017 |
| | | | 166/302 |
| 2012/0247706 A1 | 10/2012 | Cui et al. | |
| 2012/0273158 A1 | 11/2012 | Cui et al. | |
| 2014/0295365 A1 | 10/2014 | Casset | |
| 2015/0047846 A1* | 2/2015 | van Oort | ............ E21B 36/001 |
| | | | 166/302 |

OTHER PUBLICATIONS

International Search Report and Written Opinion issued in related PCT Application No. PCT/US2016/059630 dated Jul. 11, 2017, 15 pages.

* cited by examiner

METHODS AND SYSTEMS FOR USING ELASTOCALORIC MATERIALS IN SUBTERRANEAN FORMATIONS

CROSS-REFERENCE TO RELATED APPLICATION

The present application is a U.S. National Stage Application of International Application No. PCT/US2016/059630 filed Oct. 31, 2016, which is incorporated herein by reference in its entirety for all purposes.

BACKGROUND

The present disclosure relates to methods and systems for using elastocaloric materials in subterranean formations.

A variety of downhole packages, for example, electronic packages and instrumentation packages, are utilized in subterranean formations during hydrocarbon exploration and production operations. Downhole packages are typically designed to operate below a maximum temperature. When a downhole package is placed in the subterranean formation, its temperature may increase as a result of the natural temperature of the subterranean formation in which it is being used. Additionally, many of these downhole packages used downhole generate heat during operation which may raise the temperature of the downhole package.

Reaching or exceeding the maximum temperature of a downhole package may result in ineffective operation and/or complete destruction of the downhole package. As a result, the downhole package may need to be frequently replaced. Furthermore, additional steps may be needed to ensure the temperature in the subterranean formation does not exceed the design temperature of the downhole packages and/or to cool downhole packages prior to being introduced into the subterranean formation.

BRIEF DESCRIPTION OF THE DRAWINGS

These drawings illustrate certain aspects of some of the embodiments of the present disclosure, and should not be used to limit or define the claims.

Figure 2:
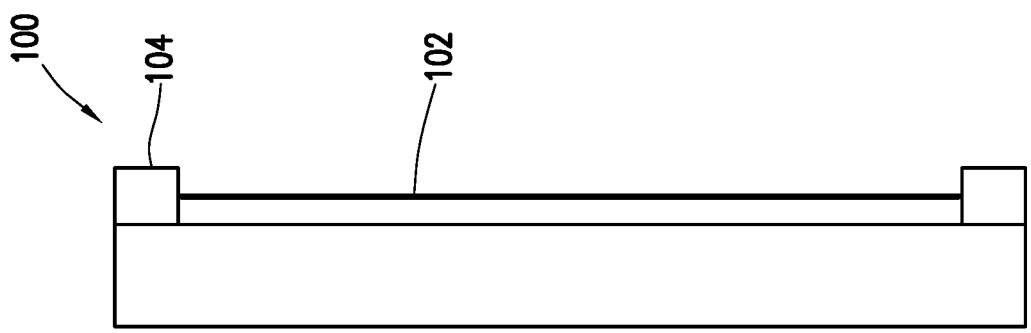
FIG. 2 is a diagram illustrating the side view of an example of a cooling apparatus comprising an elastocaloric material in accordance with one or more embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF ONE OR MORE EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of one or more embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates to methods and systems for using elastocaloric materials in subterranean formations. More particularly, the present disclosure relates to methods and systems for using a cooling apparatus comprising an elastocaloric material to reduce the temperature of downhole packages in a subterranean formation.

In one or more embodiments, the present disclosure may provide a cooling apparatus comprising an elastocaloric material coupled to at least one actuator. In one or more embodiments, the present disclosure further provides methods of introducing the cooling apparatuses of the present disclosure into a subterranean formation. For example, one or more embodiments of the present disclosure may provide methods of introducing a cooling apparatus of the present disclosure into a wellbore penetrating at least a portion of a subterranean formation, disposing the cooling apparatus adjacent to a downhole package, and allowing the elastocaloric material contained in the cooling apparatus to absorb heat thereby reducing the temperature of downhole package. In one or more embodiments, the present disclosure also provides a system comprising a cooling apparatus of the present disclosure coupled to a downhole package.

Among the many advantages to the methods and systems of the present disclosure, only some of which are alluded to herein, the methods and systems of the present disclosure may, among other benefits, provide for cooling of downhole packages located in a subterranean formation. In one or more embodiments, the methods and systems of the present disclosure may allow for the use of downhole packages in a wellbore and/or a subterranean formation having a temperature above or near the maximum temperature at which the downhole package and/or one or more components contained therein is designed to operate. The methods and systems of the present disclosure may also allow for the use of less expensive downhole tools since the cost of a downhole package typically increases as the temperature rating of the downhole package increases.

In one or more embodiments, the cooling apparatus of the present disclose may comprise an elastocaloric material and at least one actuator. The elastocaloric material comprises a material that transforms a variation in mechanical stress applied to it into a variation of its internal temperature.

Elastocaloric materials may have two crystallographic phases—a martensitic phase and an austenitic phase—and have the ability to pass reversibly from one of phase to the other as a result of undergoing a variation in stress. When an elastocaloric material passes from one phase to the other, a change in the internal temperature of the elastocaloric material occurs. When mechanical stress is applied to the elastocaloric material, an exothermic austenitic-martensitic transformation occurs, and the elastocaloric material heats up. Upon removal of the mechanical stress, an endothermic martensitic-austenitic transformation occurs, and the elastocaloric material cools down. In one or more embodiments, the elastocaloric material may absorb heat from its surroundings as it cools down.

The elastocaloric materials suitable for use in the cooling apparatuses according to the methods and systems of the present disclosure may comprise any material known in the art to exhibit the properties described above with respect to elastocaloric materials. In one or more embodiments, the elastocaloric material used in accordance with the methods and systems of the present disclosure may comprise one or more alloys where the one or more alloys comprise at least one of: copper (Cu), aluminum (Al), nickel (Ni), zinc (Zn), titanium (Ti), hafnium (Hf), zirconium (Zr), iron (Fe), cobalt (Co), manganese (Mn), gallium (Ga), bismuth (Bi), strontium (Sr), carbon (C), rhodium (Rh) or any combination thereof. In some embodiments, the elastocaloric material may be at least one of nickel titanium (Ni—Ti), nickel aluminum titanium (Ni—Al—Ti), iron rhodium (FeRh), copper zinc aluminum (for example, $Cu_{68.13}Zn_{15.74}Al_{16.13}$), a Cu-based alloy, a Fe-based alloy, or any combination thereof.

Figure 1:
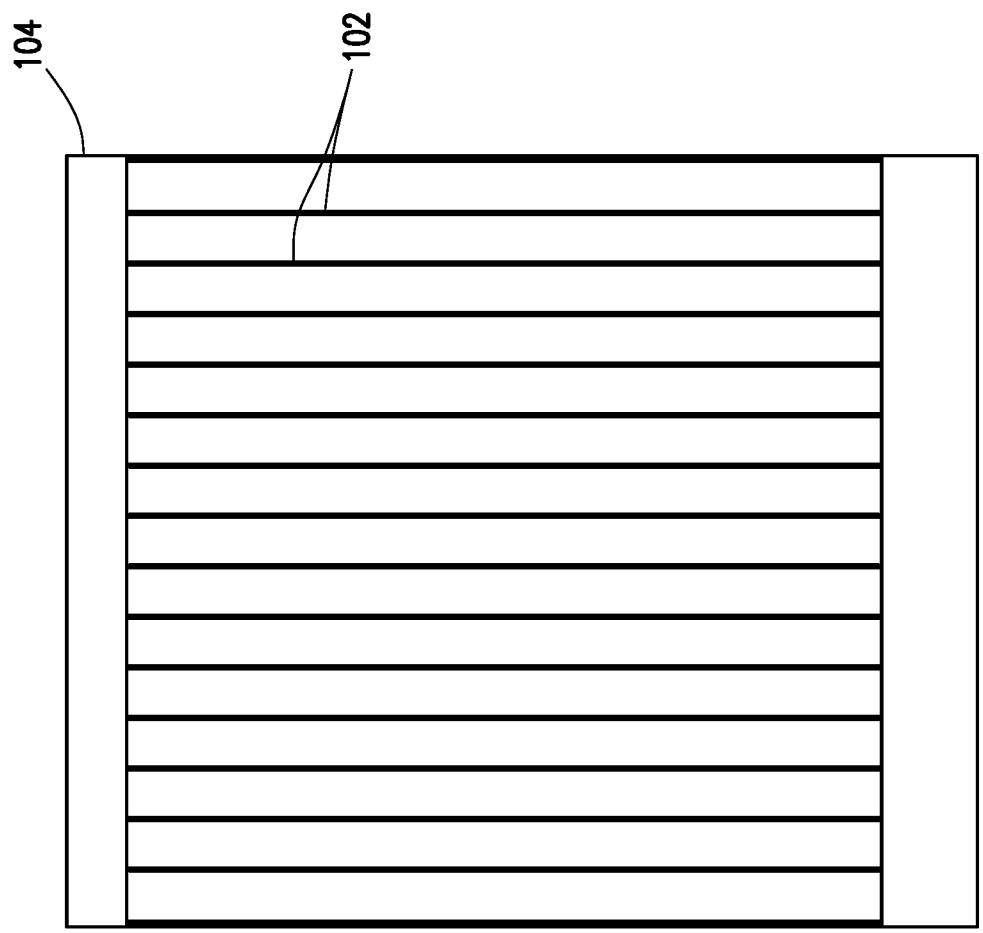
FIG. 1 is a diagram illustrating the front view of an example of a cooling apparatus comprising an elastocaloric material in accordance with one or more embodiments of the present disclosure.

In one or more embodiments, the elastocaloric material may have a structured form or shape where the structured form or shape comprises at least one of wires, tubes, rods, bars, wafers, discs, plates, ribbons, meshes, tapes, pencils, other structured forms, or any combination thereof. In some embodiments, the elastocaloric material may comprise a plurality of wires, tubes, rods, or any combination thereof. In some embodiments, the elastocaloric material may be arranged in an array across actuator 104. For example, FIGS. 1 and 2 illustrate an example of a cooling apparatus 100 comprising an elastocaloric material 102 in accordance with one or more embodiments of the present disclosure. As shown in FIGS. 1 and 2, cooling apparatus 100 comprises elastocaloric material 102 shaped as a plurality of wires that are strung into an array across one or more actuators 104. In one or more embodiments, elastocaloric material 102 may comprise any other suitable shape as discussed above. In one or more embodiments, one or more actuators 104 may be coupled to any one or more elastocaloric material 102. It will be appreciated by one of ordinary skill in the art having the benefit of the present disclosure that the amount of elastocaloric material 102 (for example, the number of wires) included in a cooling apparatus 100 of the present disclosure may vary. In one or more embodiments, elastocaloric material 102 may be coupled to actuator 104 by any mechanical means including, but not limited to, clamping, welding, soldering, and the like. In some embodiments in which elastocaloric material 102 comprises a plurality of tubes, the tubes may be hollow and a fluid may be allowed to flow through the tubes. In such embodiments, the fluid may be a heat exchange medium. In one or more embodiments, the fluid may be cycled between a downhole package that is to be cooled and a heat sink. In such embodiments, the flow of the fluid may be synchronized with the actuation of elastocaloric material 102 such that the heat is pumped from the downhole package to the sink.

Actuators 104 suitable for use in the methods and systems according to one or more embodiments of the present disclosure may comprise any actuator known in the art that is capable of adjusting (for example, exerting and/or removing) the amount of mechanical stress applied to elastocaloric material 102. Examples of actuators 104 that may be used in accordance with the methods and systems of the present disclosure include, but are not limited to, motor screw drives, piezoelectric stack actuators, magnetostrictive actuators, and the like, and any combination thereof.

Figure 3:
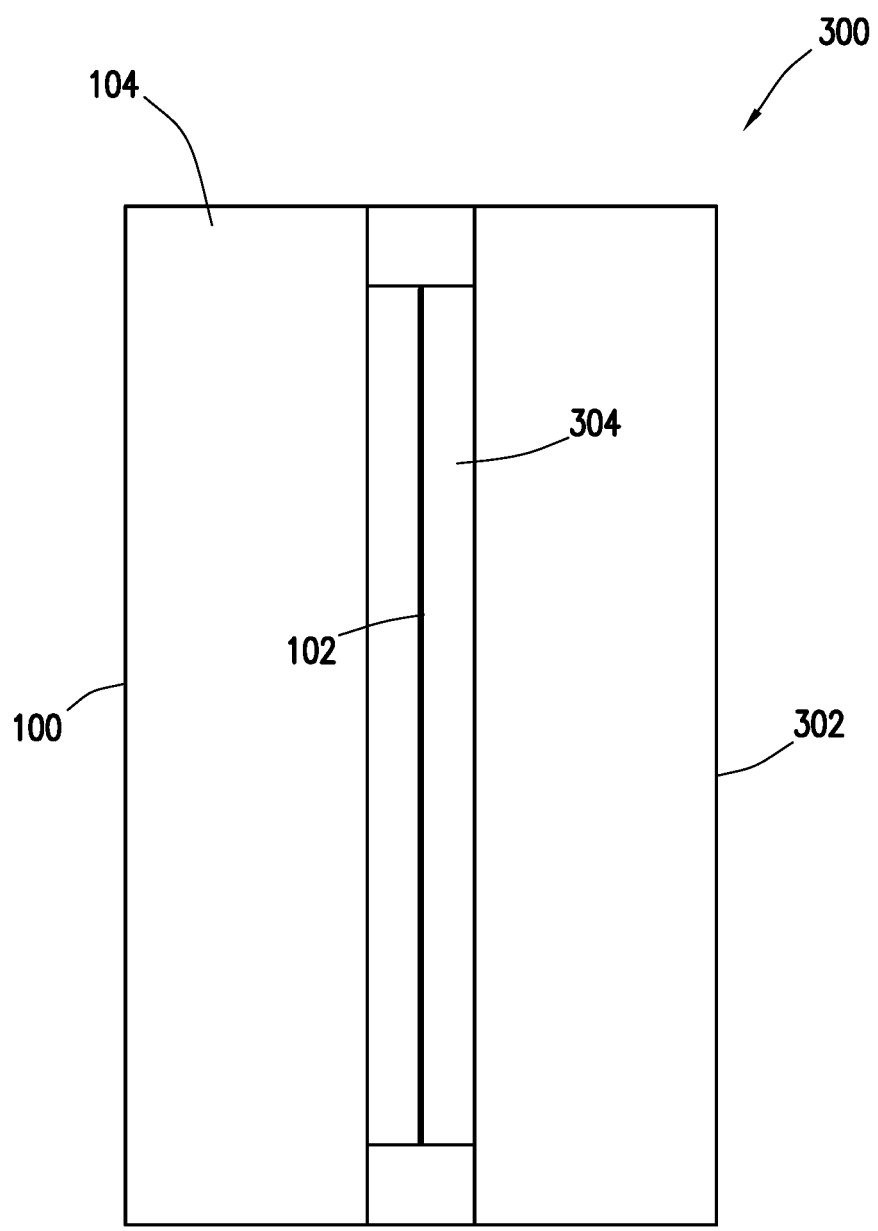
FIG. 3 a diagram illustrating an example of a system in accordance with one or more embodiments of the present disclosure.

In one or more embodiments, a cooling apparatus 100 of the present disclosure may comprise part of a system according to one or more embodiments of the present disclosure. FIG. 3 illustrates an example of a system in accordance with one or more embodiments of the present disclosure. As shown in FIG. 3, system 300 may comprise a downhole package 302 coupled to cooling apparatus 100 comprising elastocaloric material 102 and actuator 104. Downhole packages 302 may comprise any device or tool that may be used in a subterranean application or operation and that may benefit from operating at a lower temperature than that of the surrounding formation. In one or more embodiments, a downhole package 302 may include, but is not limited to, an electronics package, an optic or electro-optic package, and the like, or any combination thereof. In some embodiments, downhole package 302 may be comprised of one or more components.

The one or more components may include, but are not limited to, one or more of detectors, sensors, memory, electronic components such as resistors, capacitors, inductors, diodes, transistors, metal-oxide-semiconductor field-effect transistors (MOSFETs) etc., processors, microprocessors, light sources such as lasers, LEDs, or any combination thereof. In one or more embodiments, the systems of the present disclosure may further comprise one or more batteries (not shown) coupled to actuator 104, downhole package 102, or both. In such embodiments, the battery may supply power to actuator 104, downhole package 102, or both. It will be appreciated by one of ordinary skill in the art having the benefits of the present disclosure that systems 300 of the present disclosure may further comprise other common components of cooling systems, for example, a heat removal unit (for example, a radiator).

Figure 4:
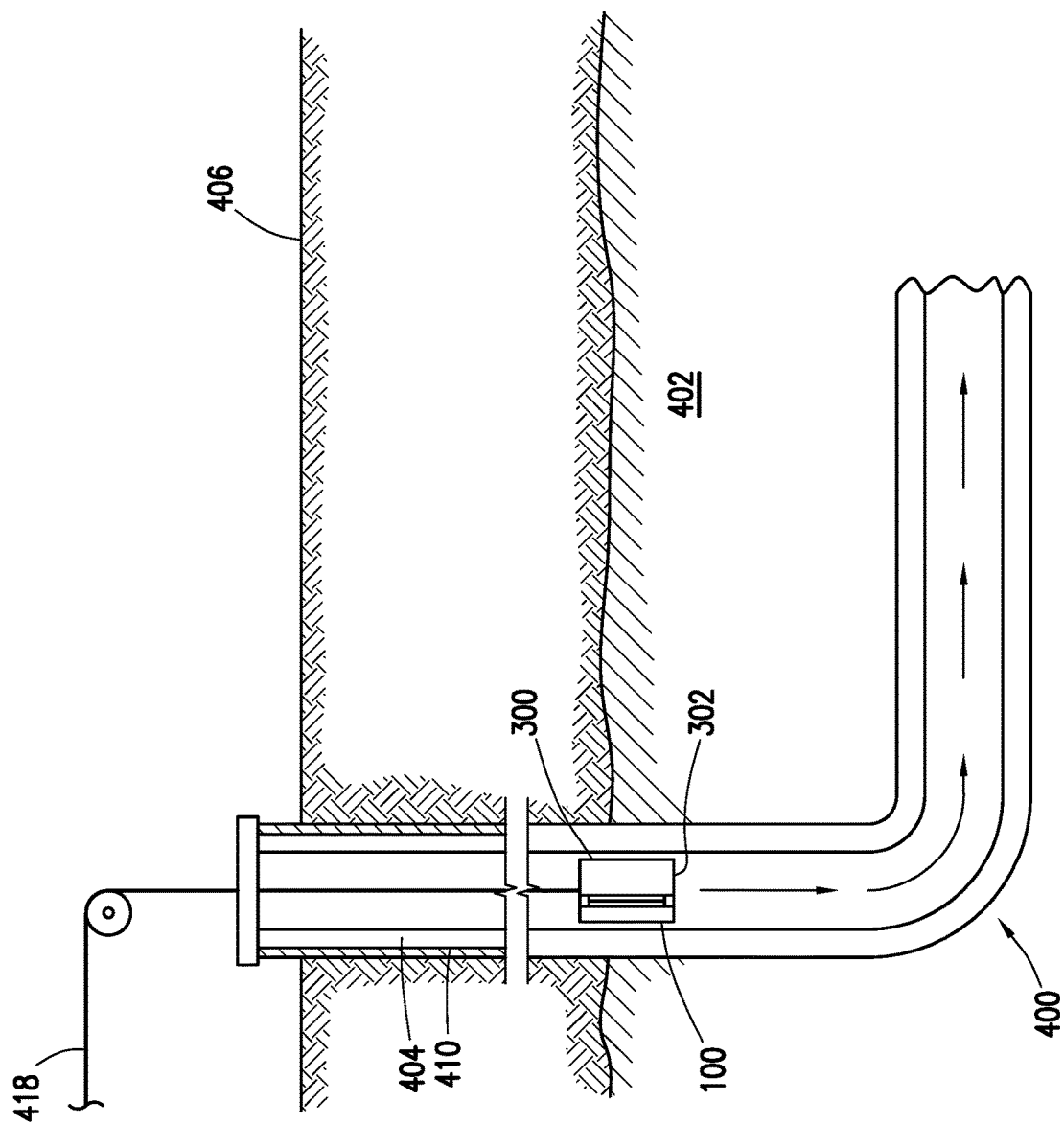
FIG. 4 is a diagram illustrating an example of a well in which methods may be performed in accordance with one or more embodiments of the present disclosure.

FIG. 4 is a diagram illustrating an example of a well 400 in which systems and methods of the present disclosure may be used in accordance with one or more embodiments of the present disclosure. A wellbore 404 penetrates at least a portion of a subterranean formation 402. The wellbore extends from the surface 406. Although shown as vertical deviating to horizontal, the wellbore 404 may include may include horizontal, vertical, slant, curved, and other types of wellbore geometries and orientations. The wellbore 404 may include a casing 410 that is cemented or otherwise secured to the wellbore wall. The wellbore 404 may be uncased or include uncased sections. Perforations (not shown) may be formed in the casing 410 to allow treatment fluids and/or other materials to flow into the subterranean formation 402. In cased wells, such perforations may be formed using shape charges, a perforated gun, hydro-jetting, slotted liner, and/or other tools.

As illustrated in FIG. 4, a system 300 of the present disclosure may be introduced into wellbore 404. System 300 may comprise cooling apparatus 100 of the present disclosure coupled to downhole package 302. As shown in FIGS. 1-3, cooling apparatus 100 may comprise elastocaloric material 102 and at least one actuator 104. In some embodiments, downhole package 302 and its components may be designed to withstand one or more conditions present in wellbore 404, including, but not limited to, temperature, pressure, pH of fluids, and any other condition.

System 300 (via cooling apparatus 100, downhole package 302, or both) may be coupled to a conveyance device 418, such as a wireline, a slickline, a work string, a drill string, any other conveyance device, or any combination thereof. In such embodiments, conveyance device 418 may be used to introduce, dispose, position or otherwise place system 300 (cooling apparatuses 100, downhole package 302, or both) into a wellbore 404 of a subterranean formation 402. In one or more embodiments, the conveyance device 418 may lower system 300 to a desired or predetermined depth in the wellbore 404. In some embodiments, conveyance device 418 also may supply power to system 300 (for example, actuator 104, downhole package 302, or both).

FIG. 4 shows the entire system 300 being introduced into wellbore 404 via the conveyance device 418. However, in some embodiments, cooling apparatus 100 and downhole package 302 may be introduced into the wellbore separately and may be introduced using separate conveyance devices 418. In such embodiments, downhole package 302 may be separately disposed in wellbore 404 either before or after cooling apparatus 100 is disposed in wellbore 404. Cooling apparatus 100 and downhole package 302 may be placed adjacent to one another in wellbore 404. Once system 300 (both cooling apparatus 100 and downhole package 302) is introduced into wellbore 404, cooling apparatus 100 may be used to cool (for example, reduce the temperature of) downhole package 302 in accordance with the methods of the present disclosure described in detail below.

In one or more embodiments, the present disclosure also provides methods of using a cooling apparatus 100 of the present disclosure in wellbore 404 penetrating a portion of subterranean formation 402. In some embodiments, the methods of the present disclosure may involve using cooling apparatus 100 of the present disclosure to cool a downhole package 302. In one or more embodiments, cooling apparatus 100 of the present disclosure (as described above according to one or more embodiments) may be introduced into wellbore 404 penetrating a portion of subterranean formation 402. In one or more embodiments, cooling apparatus 100 may be disposed adjacent to downhole package 302. As used herein, the term "adjacent" may refer to proximate, next to, abutting, touching, adjoining, near, close to, beside, coupled to, attached to, and the like. In some embodiments, cooling apparatus 100 may be adjacent to downhole package 302 prior to the cooling apparatus being disposed in the wellbore. In such embodiments, cooling apparatus 100 may be coupled to downhole package 302 in accordance with one or more embodiments of the systems of the present disclosure. In other embodiments, downhole package 302 may be disposed in a desired or predetermined location in wellbore 404 and cooling apparatus 100 may be disposed adjacent to downhole package 302 while in the wellbore 404.

In one or more embodiments, downhole package 302 may have an initial temperature when it is introduced or initially disposed in wellbore 404 or the subterranean formation 402. In one or more embodiments, wellbore 404, subterranean formation 402, or both may have a higher temperature than the initial temperature of the downhole package. In some embodiments, wellbore 404, subterranean formation 402, or both may have a temperature above, near, or within a predetermined threshold of the maximum temperature at which at least one of downhole package 302, one or more components of downhole package 302, or both is designed to operate. In one or more embodiments, downhole package 302, one or more components of downhole package 302, or both may generate heat during operation. Accordingly, the temperature of or associated with downhole package 302 may increase from an initial temperature as a result of at least one of the heat generated by downhole package 302, one or more components of downhole package 302, heat present in wellbore 404, subterranean formation 402, or both, or any combination thereof. Thus, cooling apparatus 100 may be used to cool (for example, reduce the temperature of) downhole package 302, one or more components of downhole package 302, or both. It will be appreciated by one of ordinary skill in the art having the benefits of the present disclosure that the methods of the present disclosure may be performed in conjunction with optimizing the load of downhole package 302, one or more components of downhole package 302, or both such that any one of downhole package 302, one or more components of downhole package 302, or both generates less heat than would be generated without optimizing the load and the amount which any one of downhole package 302, one or more components of downhole package 302, or both needs to be cooled to remain operable is reduced as compared to without optimizing the load.

In one or more embodiments, actuator 104 of cooling apparatus 100 of the present disclosure may be actuated such that elastocaloric material 102 is stretched or relaxed. In some embodiments, elastocaloric material 102 may be stretched or relaxed in the axial direction. When elastocaloric material 102 is stretched, actuator 104 applies mechanical stress to elastocaloric material 102. In some embodiments, the stretching by actuator 104 may cause elastocaloric material 102 to undergo an exothermic austenitic-martensitic transformation, and elastocaloric material 102 may heat up, release heat, or both.

In the embodiments in which elastocaloric material 102 is relaxed, actuator 104 reduces the amount of mechanical stress applied to elastocaloric material 102. In some embodiments, the relaxing by actuator 104 may cause elastocaloric material 102 to undergo an endothermic martensitic-austenitic transformation, and elastocaloric material 102 may cool down, absorb heat, or both. In such embodiments, elastocaloric material 102 may absorb at least a portion of heat that is present in wellbore 404, at least a portion of heat that is generated by downhole package 302, or both. As a result, the temperature of downhole package 302, one or more components of downhole package 302, or both may be reduced (for example, downhole package 302, one or more components of downhole package 302, or both may be cooled).

In one or more embodiments, a heat exchange medium 304 may be used to transfer heat between elastocaloric material 102 and downhole package 302. In one or more embodiments, elastocaloric material 102 may be contacted with a heat exchange medium. In some embodiments, elastocaloric material 102 may be in a relaxed state such that it is cooled down at the point in time it is contacted by heat exchange medium 304. In such embodiments, elastocaloric material 102 may absorb at least a portion of the heat from heat exchange medium 304 when contacted by or coupled to heat exchange medium 304. As a result, the temperature of heat exchange medium 304 may be reduced resulting in a cooled heat exchange medium 304.

In one or more embodiments, downhole package 302 may be contacted by or coupled to cooled heat exchange medium 304. In such embodiments, cooled heat exchange medium 304 may absorb at least a portion of heat that is present in wellbore 404, at least a portion of heat that is generated by downhole package 302, or both. As a result, the temperature of downhole package 302, one or more components of downhole package 302, or both may be reduced (for example, downhole package 302, one or more components of downhole package 302, or both may be cooled) and cooled heat exchange medium 304 may heat up. In one or more embodiments, the heat transfer from heat exchange medium 304 to elastocaloric material 102 and the heat transfer from downhole package 302 to heat exchange medium 304 may occur at the same time or substantially simultaneously. In some embodiments, for example, as shown as in FIG. 3, heat exchange medium 304 may flow between actuator 104 and downhole package 302. It will be appreciated by one of ordinary skill in the art having the benefit of the present disclosure that the amount by which the temperature of downhole package 302, one or more components of downhole package 302 may be reduce may vary based on, for example, the temperature difference between elastocaloric material 102 and downhole package 302 or the surface area of elastocaloric material 102, downhole package 302, or both that is in contact with or coupled to heat exchange medium 304.

A heat exchange medium 304 may comprise any medium through which heat may be transferred. In one or more embodiments, heat exchange medium 304 may be a fluid including, but not limited to, air, a treatment fluid, helium, argon, thermal compound, thermal grease, a fluorinated hydrocarbon, and any combination thereof. In one or more embodiments, heat exchange medium 304 may be a treatment fluid used to treat at least a portion of the subterranean formation or one or more fluids produced from the subterranean formation.

In one or more embodiments, after heat exchange medium 304 has absorbed at least a portion of the heat from downhole package 302, one or more components of downhole package 302, wellbore 404, subterranean formation 402, or any device, tool, or system deployed downhole, heat exchange medium 304 may contain a significant amount of heat or may exceed a predetermined threshold. Heat exchange medium 304 may be used in a variety of applications and operations. For example, in some embodiments, heat exchange medium 304 may be deployed at, conveyed to, or transported to a heat dump. In other embodiments, heat exchange medium 304 may be used to drive chemical reactions.

An embodiment of the present disclosure is a method comprising: disposing a downhole package in a wellbore penetrating a portion of a subterranean formation; and disposing a cooling apparatus comprising an elastocaloric material and at least one actuator downhole in the wellbore, wherein the cooling apparatus is adjacent to the downhole package.

Another embodiment of the present disclosure is a method comprising: introducing a cooling apparatus comprising an elastocaloric material and at least one actuator into a wellbore penetrating a portion of a subterranean formation, wherein the cooling apparatus is disposed adjacent to a downhole package having a temperature; actuating the actuator to reduce an amount of mechanical stress applied to the elastocaloric material; contacting the elastocaloric material with a heat exchange medium to cool the heat exchange medium; and absorbing heat associated with at least one of the wellbore, the subterranean formation, or one or more downhole components by the heat exchange medium to reduce a temperature of the downhole package.

Another embodiment of the present disclosure is a system comprising: a downhole package having a temperature; and a cooling apparatus coupled to the downhole package, wherein the cooling apparatus comprises an elastocaloric material coupled to at least one actuator, wherein the cooling apparatus is configured to reduce the temperature of the downhole package.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (for example, "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   disposing a downhole package in a wellbore penetrating a portion of a subterranean formation using a conveyance device; and
   disposing a cooling apparatus comprising an elastocaloric material and at least one actuator downhole in the wellbore after the disposition of the downhole package into the wellbore, wherein the cooling apparatus is separately placed adjacent to the downhole package using a separate conveyance device after the downhole package has been disposed in the wellbore, wherein the elastocaloric material is coupled to a first end of the at least one actuator and a second end of the at least one actuator that is opposite to the first end, wherein the at least one actuator is configured to apply a mechanical stress along an axial direction of the elastocaloric material, and wherein the at least one actuator comprises a piezoelectric stack actuator or a magnetostrictive actuator.

2. The method of claim 1 further comprises coupling the cooling apparatus to the downhole package, wherein the coupling occurs prior to disposing the cooling apparatus and the downhole package in the wellbore.

3. The method of claim 1, wherein the elastocaloric material comprises a plurality of wires, tubes, or rods arranged in an array across the at least one actuator.

4. The method of claim 1, wherein the elastocaloric material comprises one or more of copper, aluminum, nickel, zinc, titanium, hafnium, zirconium, iron, cobalt, manganese, gallium, bismuth, strontium, carbon, and rhodium.

5. The method of claim 1 further comprising actuating the at least one actuator to reduce an amount of mechanical stress applied to the elastocaloric material.

6. The method of claim 5 further comprising absorbing at least a portion of heat present in the wellbore via the elastocaloric material.

7. The method of claim 6, wherein at least a portion of the heat absorbed via the elastocaloric material is generated by the downhole package.

8. The method of claim 5 further comprising cooling the downhole package, wherein cooling the downhole package comprises:
contacting the cooling apparatus with a heat exchange medium;
cooling the heat exchange medium, wherein cooling the heat exchange medium comprises absorbing at least a portion of heat from the heat exchange medium via the elastocaloric material; and
contacting the downhole package with the cooled heat exchange medium, wherein the cooled heat exchange medium absorbs at least a portion of heat present in the wellbore.

9. The method of claim 1, wherein the downhole package is an optic package or an electro-optic package.

10. The method of claim 1, wherein the downhole package is a sensor, a detector, or a light source.

11. A method comprising:
introducing a cooling apparatus comprising an elastocaloric material and at least one actuator into a wellbore penetrating a portion of a subterranean formation using a conveyance device, wherein the cooling apparatus is disposed adjacent to a downhole package having a temperature using the conveyance device, wherein the elastocaloric material is coupled to a first end of the at least one actuator and a second end of the at least one actuator that is opposite to the first end, wherein the at least one actuator is configured to apply a mechanical stress along an axial direction of the elastocaloric material, and wherein the at least one actuator comprises a piezoelectric stack actuator or a magnetostrictive actuator;
actuating the at least one actuator to reduce an amount of mechanical stress applied to the elastocaloric material;
contacting the elastocaloric material with a heat exchange medium to cool the heat exchange medium, wherein the heat exchange medium is selected from a group consisting of helium, argon, a thermal compound, a thermal grease, and any combination thereof; and
absorbing heat associated with at least one of the wellbore, the subterranean formation, or one or more downhole components by the heat exchange medium to reduce a temperature of the downhole package.

12. The method of claim 11 further comprising conveying the heat exchange medium to a heat dump.

13. The method of claim 11, wherein the downhole package comprises at least one of the one or more downhole components, and wherein the one or more downhole components comprise at least one of a detector, a sensor, memory, an electronic component, a resistor, a capacitor, an inductor, a diode, a transistor, a metal-oxide-semiconductor field-effect transistor (MOSFET), a processor, a microprocessor, and a light source.

14. The method of claim 11, wherein the heat exchange medium comprises at least one of air, a treatment fluid, helium, argon, a thermal compound, a thermal grease, and a fluorinated hydrocarbon.

15. A system comprising:
a downhole package having a temperature; and
a cooling apparatus coupled to the downhole package, wherein there is a heat exchange medium disposed between the cooling apparatus and the downhole package, wherein the heat exchange medium is selected from a group consisting of helium, argon, a thermal compound, a thermal grease, and any combination thereof, wherein the cooling apparatus comprises an elastocaloric material coupled to at least one actuator, wherein the elastocaloric material is coupled to a first end of the at least one actuator and a second end of the at least one actuator that is opposite to the first end, wherein the at least one actuator is configured to apply a mechanical stress along an axial direction of the elastocaloric material, wherein the cooling apparatus is configured to reduce the temperature of the downhole package, and wherein the at least one actuator comprises a piezoelectric stack actuator or a magnetostrictive actuator.

16. The system of claim 15 further comprising a battery coupled to the at least one actuator, wherein the battery supplies power to the at least one actuator.

17. The system of claim 15, wherein the cooling apparatus is coupled to a wireline, a slickline, a work string, or a drill string.

18. The system of claim 15, wherein the elastocaloric material comprises a plurality of wires, tubes, or rods arranged in an array across the at least one actuator.

19. The system of claim 15, wherein the elastocaloric material comprises one or more of copper, aluminum, nickel, zinc, titanium, hafnium, zirconium, iron, cobalt, manganese, gallium, bismuth, strontium, carbon, and rhodium.

* * * * *